(12) United States Patent
Tseng et al.

(10) Patent No.: US 12,720,073 B2
(45) Date of Patent: Aug. 25, 2026

(54) ENCODER AND ASSOCIATED ENCODING METHOD

(71) Applicant: Realtek Semiconductor Corp., HsinChu (TW)

(72) Inventors: Yi-Chen Tseng, HsinChu (TW); Wei Li, Suzhou City (CN); Weimin Zeng, San Jose, CA (US); Chi-Wang Chai, Santa Clara, CA (US); Wujun Chen, Suzhou City (CN)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 19/026,447

(22) Filed: Jan. 17, 2025

(65) Prior Publication Data

US 2026/0214239 A1 Jul. 23, 2026

(51) Int. Cl.
*H04N 19/146* (2014.01)
*H04N 19/174* (2014.01)
*H04N 19/176* (2014.01)

(52) U.S. Cl.
CPC ......... *H04N 19/146* (2014.11); *H04N 19/174* (2014.11); *H04N 19/176* (2014.11)

(58) Field of Classification Search
CPC ... H04N 19/146; H04N 19/174; H04N 19/176
See application file for complete search history.

(56) References Cited

U.S. PATENT DOCUMENTS

| | | | | |
|---|---|---|---|---|
| 11,582,443 | B1 | 2/2023 | Chaudhari | |
| 2013/0287099 | A1* | 10/2013 | Kwon | H04N 19/86 375/240.03 |
| 2014/0341302 | A1* | 11/2014 | Wang | H04N 19/30 375/240.26 |
| 2016/0105682 | A1 | 4/2016 | Rapaka | |
| 2016/0234491 | A1* | 8/2016 | Mammou | H04N 19/124 |
| 2021/0266576 | A1 | 8/2021 | Zhang | |
| 2024/0267528 | A1 | 8/2024 | Zeng et al. | |
| 2025/0274587 | A1 | 8/2025 | Krishnan | |

OTHER PUBLICATIONS

Tseng, the specification, including the claims, and drawings in the U.S. Appl. No. 19/026,505 , Filing Date: Jan. 17, 2025.

* cited by examiner

*Primary Examiner* — Jae N Noh
(74) *Attorney, Agent, or Firm* — Winston Hsu

(57) ABSTRACT

The present invention provides an encoding method, which includes steps of: determining a first quantization parameter of a first superblock of an image frame; determining a binary code for the first superblock; determining whether binary code information of the first superblock is greater than a first threshold; and if the binary code information of the first superblock is greater than the first threshold, increasing a second quantization parameter of a second superblock.

14 Claims, 5 Drawing Sheets

: Encoding has been completed and encoded data has been generated

: In the process of encoding/compressing

: In the process of determining quantization parameter

ENCODER AND ASSOCIATED ENCODING METHOD

BACKGROUND OF THE INVENTION

1. Field of the Invention

The present invention relates to a video encoder

2. Description of the Prior Art

In bitrate control operations of an encoder, there are generally two types: constant bitrate (CBR) and variable bitrate (VBR). The constant bitrate refers to the encoder outputting image data with a fixed bitrate to facilitate transmission over a channel with limited bandwidth, while the variable bitrate means that the encoder adjusts the output bitrate according to the complexity of the input signal, in order to maintain the quality of the output image. However, due to the limited capacity of the buffer of the encoder, it is difficult to implement the constant bitrate and variable bitrate control methods in low-latency applications.

SUMMARY OF THE INVENTION

Therefore, one of the objectives of the present invention is to propose an encoder and related encoding method, which can effectively control the bitrate of the encoder, in order to solve the problems described in the prior art.

According to one embodiment of the present invention, an encoding method comprises the steps of: determining a first quantization parameter of a first superblock of an image frame; determining a binary code for the first superblock; determining whether binary code information of the first superblock is greater than a first threshold; and if the binary code information of the first superblock is greater than the first threshold, increasing a second quantization parameter of a second superblock.

According to one embodiment of the present invention, an encoder is configured to perform steps of: determining a first quantization parameter of a first superblock of an image frame; determining a binary code for the first superblock; determining whether binary code information of the first superblock is greater than a first threshold; and if the binary code information of the first superblock is greater than the first threshold, increasing a second quantization parameter of a second superblock.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
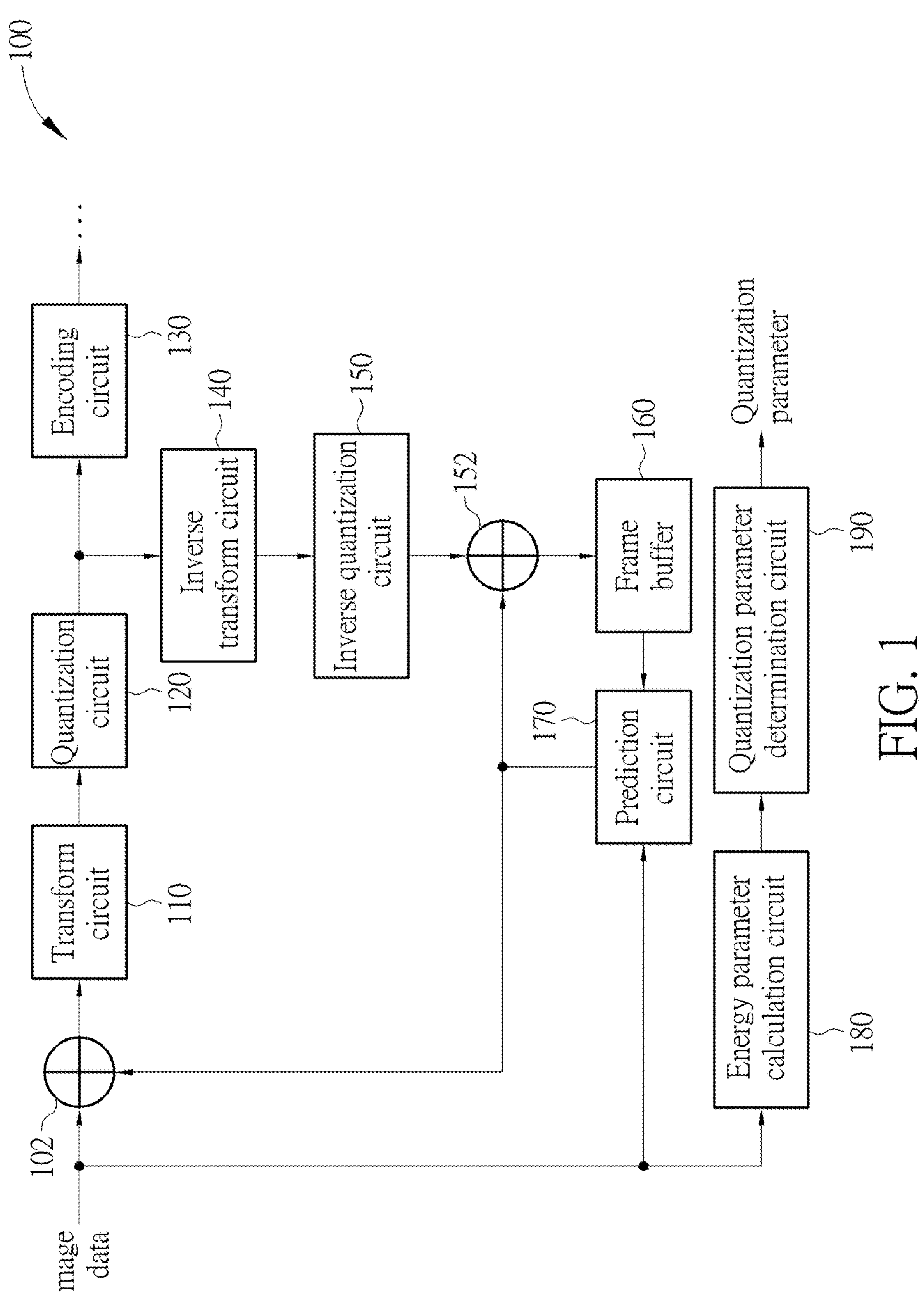
FIG. 1 is a schematic diagram of an encoder according to an embodiment of the present invention.

FIG. 1 is a schematic diagram of an encoder 100 according to an embodiment of the present invention. As shown in FIG. 1, the encoder 100 includes a calculation circuit 102, a transform circuit 110, a quantization circuit 120, an encoding circuit 130, an inverse quantization circuit 140, an inverse transform circuit 150, a calculation circuit 152, a frame buffer 160, a prediction circuit 170, an energy parameter calculation circuit 180, and a quantization parameter determination circuit 190. In this embodiment, the encoder 100 supports the AV1 video encoding format established by the Alliance for Open Media (AOMedia), but the present invention is not limited to this.

In the main operation of the encoder 100, the prediction circuit 170 is used to receive external image data (image frames) and interpolated frames or adjusted image data generated internally by the encoder 100, in order to generate predicted image data. The calculation circuit 102 subtracts the predicted image data generated by the prediction circuit 170 from the image data to obtain residual error data. Specifically, the prediction circuit 170 can first divide the received image frame into multiple blocks and perform inter-frame prediction, intra-frame prediction, motion estimation, and/or motion compensation on these blocks to generate predicted image data. This predicted data is then used by the calculation circuit 102 to calculate residual error data corresponding to each of the blocks. Then, the transform circuit 110 performs Discrete Cosine Transform (DCT) operation on the multiple residual error data to convert the data into frequency-domain data. The quantization circuit 120 then performs a quantization operation on the frequency-domain data generated by the transform circuit 110 to generate quantized data, where the quantization operation for each image frame corresponds to a quantization parameter. The quantized data is subsequently processed by the encoding circuit 130 to generate encoded data, which is then transmitted through the backend channel to a decoder (not shown). In addition, the inverse quantization circuit 140 performs an inverse quantization operation on the quantized data generated by the quantization circuit 120, and the inverse transform circuit 150 performs an inverse transform operation (inverse DCT) on the output of the inverse quantization circuit 140 to generate inverse-transformed residual error data. The calculation circuit 152 then adds the inverse-transformed residual error data generated by the inverse transform circuit 150 to the predicted image data generated by the prediction circuit 170, to generate adjusted image data, which is stored in the frame buffer 160 for use by the prediction circuit 170. Furthermore, the energy parameter calculation circuit 180 is used to determine the energy parameter for each block, which is then used by the quantization parameter determination circuit 190 to determine the quantization parameter.

It should be noted that the main operations of the calculation circuit 102, transform circuit 110, quantization circuit 120, encoding circuit 130, inverse quantization circuit 140, inverse transform circuit 150, calculation circuit 152, frame buffer 160, and prediction circuit 170 in the encoder 100 are well known to a person skilled in the art. The detailed operations of the energy parameter calculation circuit 180 and the quantization parameter determination circuit 190 can be referenced in the U.S. patent application (Publication No.

US2024/0267528). Since the key technical content of the present invention lies in the operation of the encoding circuit 130, the details of the aforementioned components are omitted here.

In the AV1 video encoding format, multiple coding units of different sizes are defined. The largest coding unit is referred to as a superblock, coding tree unit (CTU), or largest coding unit (LCU), with sizes typically being 128×128 pixels or 64×64 pixels. In the following embodiments, the term "superblock" is used to refer to these units.

Figure 2:
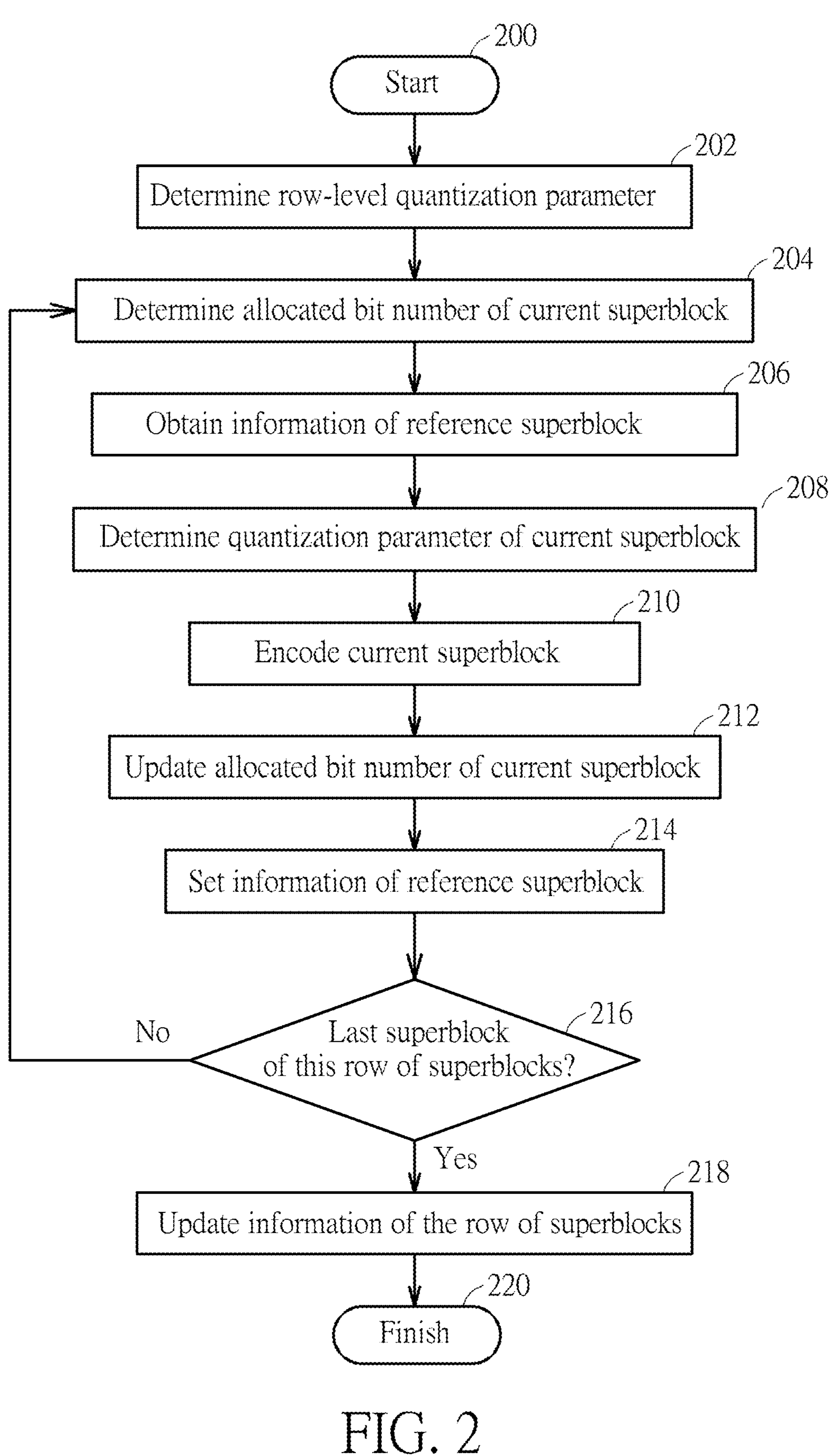
FIG. 2 is a flowchart of encoding a row of superblocks in image data according to an embodiment of the present invention.

FIG. 2 is a flowchart of encoding a row of superblocks in image data (image frame) according to an embodiment of the present invention. In Step 200, the flow starts. In Step 202, the encoder 100 determines the row-level quantization parameter. In Step 204, the encoder 100 begins processing each superblock in the row of superblocks sequentially. For the current superblock (currently processed block), the encoder 100 determines the allocated bit number for this superblock according to the bit budget (or remaining bits) of the row of superblocks. In Step 206, the encoder 100 obtains information of a reference superblock for the current superblock, such as the estimated bit number for the surrounding superblocks, the encoding mode, or the quantization parameter, etc. In Step 208, the encoder 100 determines the quantization parameter for the current superblock according to the information of the reference superblock and the allocated bit number for the current superblock. In Step 210, the encoder 100 encodes the current superblock, for example, using Context-based Adaptive Binary Arithmetic Coding (CABAC), to generate encoded data. In Step 212, the encoder 100 uses the encoded data to update the allocated bit number for the current superblock. In Step 214, the encoder 100 sets the information of the reference superblock according to encoded information of the current superblock for use by subsequent superblocks. In Step 216, the encoder 100 determines if the current superblock is the last superblock of the row (e.g., the rightmost superblock). If it is, the flow enters Step 218; and if not, the flow goes back to Step 204 to process the next row of superblocks. In Step 218, the encoder 100 updates the row-level information, such as the remaining bits of the row of superblocks. In Step 220, the flow ends, and the encoder 100 begins processing another row of superblocks.

Since the focus of the present invention lies in the process of encoding the superblock in step S210 and the subsequent Steps 212 and 214 in FIG. 2, and since the other steps are well known to a person skilled in the art, the following will primarily describe the contents of Steps 210, 212 and 214.

In the prior art of AV1 video encoding, the CABAC encoding model used for encoding involves the use of a Cumulative Distribution Function (CDF) table to encode the current superblock. During the encoding process of the current superblock, the contents of the CDF table are also updated for use when encoding the next superblock. However, because the CABAC encoding model operates row by row to sequentially encode superblocks and generate encoded data, and updates the CDF table for use in encoding the next superblock, if the CABAC encoding model is not fast enough or if the superblock has complex textures that require more time to generate encoded data, it could potentially affect the performance of quantization parameter determination and encoding of subsequent superblocks. Specifically, when the encoder 100 processes the current superblock, the following steps (not all complete) can be sequentially included: (1) determine the quantization parameter of the current superblock according to at least the quantization parameters of previous superblocks, the quantization parameters of the previous frame, and the encoded data generated after encoding the previous superblock; (2) determine the binary code for the current superblock, where this binary code is generated from multiple parameters of the superblock, the size of the binary code is related to the texture complexity of the current superblock, meaning that if the texture complexity is higher, the binary code will have a larger data size; (3) encode/compress the binary code of the current superblock to generate the encoded data. In steps (2) and (3), if the binary code of the current superblock has large data size, it may require a long time for step (3) to encode the current superblock, which could result in subsequent superblocks being unable to immediately use the encoded data of the current superblock to determine their quantization parameters.

Therefore, the present invention proposes the following embodiments to reduce the impact on the overall operation of the encoder 100 caused by the texture complexity of a particular superblock.

Figure 3:
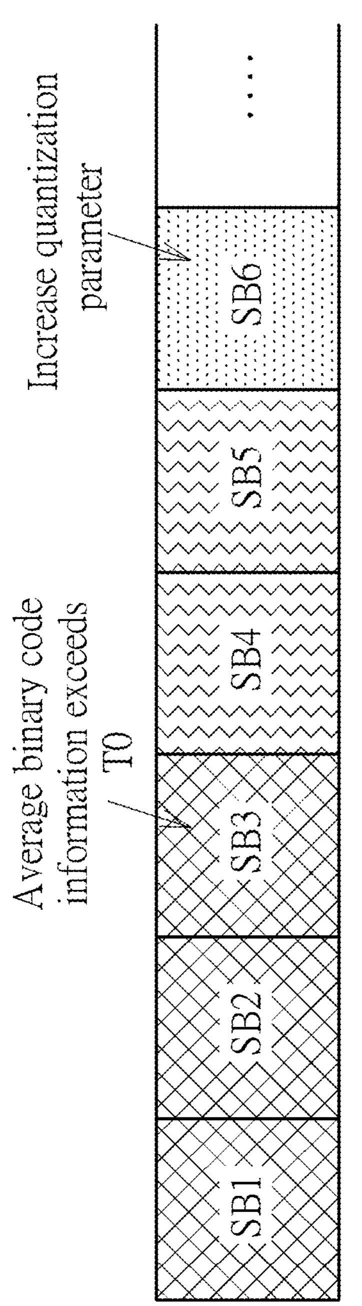
FIG. 3 is a schematic diagram of an encoder encoding multiple superblocks of an image frame according to a first embodiment of the present invention.

IG. 3 is a schematic diagram of the encoder 100 encoding multiple superblocks SB1-SB6 of an image frame according to a first embodiment of the present invention, wherein the superblocks SB1-SB6 belong to the same row of superblocks of the image frame. In FIG. 3, it is assumed that the superblocks SB1-SB3 have already been encoded and generated encoded data; the superblocks SB4 and SB5 have determined their quantization parameters and binary codes, and are in the process of encoding/compressing to begin generating encoded data; and the superblock SB6 is in the process of determining its quantization parameter. In this embodiment, the encoding circuit 130 of the encoder 100 will count (or accumulate) the binary code information of all superblocks in the row that have already generated binary codes, and determine whether the binary code information exceeds a threshold value T0 to determine whether to increase the quantization parameters of subsequent superblocks. Taking FIG. 3 as an example, after the encoding circuit 130 determines the binary code for the superblock SB4, the encoding circuit 130 counts the binary code information of all superblocks SB1-SB4 that have already determined their binary codes, wherein the binary code information can be binary code data amount or binary rate, and the binary rate refers to the binary code data amount divided by the time of generating the binary codes of the superblocks SB1-SB4. If the binary code information of the superblocks SB1-SB4 exceeds the threshold value T0, then the quantization parameter of superblock SB6 will be increased to ensure that the superblock SB6 generates encoded data with fewer bits during subsequent encoding. In other words, when the binary code information of superblocks SB1-SB4 exceeds the threshold value T0, it indicates that the amount or speed of the binary code generated may be approaching or exceeding the processing capacity of the encoding circuit 130, potentially causing delays or excessive bitrates in the encoded data. Therefore, the encoder 100 increases the quantization parameter for superblock SB6 to reduce the amount of encoded data and stabilize the output bitrate of the image frame. For example, if the binary code information of the superblocks SB1-SB4 is not greater than the threshold value TO, the encoder 100 determines that the superblock SB6 has the quantization parameter Q1 according to the current mechanism; and if the binary code information of the superblocks SB1-SB4 is greater than the threshold value T0, the encoder 100 determines that the superblock SB6 has a quantization parameter (Q1+ΔQ), where the offset ΔQ is any suitable positive integer.

Figure 4:
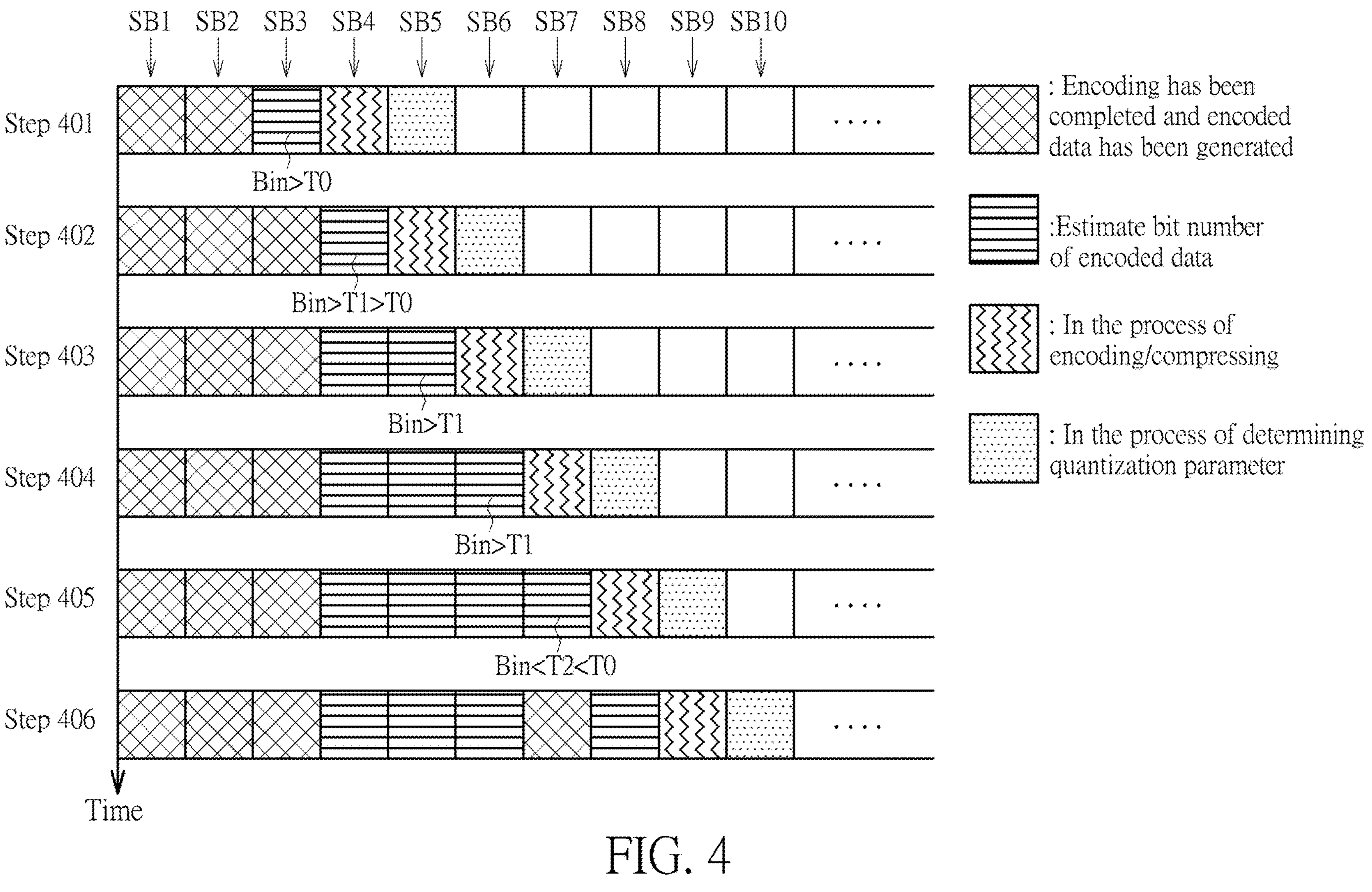
FIG. 4 is a schematic diagram of an encoder encoding multiple superblocks of an image frame according to a second embodiment of the present invention.

FIG. 4 is a schematic diagram of the encoder 100 encoding multiple superblocks of an image frame according to a second embodiment of the present invention. Referring to FIG. 4, in Step 401, the superblocks SB1-SB2 have already been encoded and generated encoded data, the superblocks SB3 and SB4 have determined their quantization parameters and binary codes, and the superblock SB5 is in the process of determining its quantization parameter. In this embodiment, when processing the superblock SB3, the binary code information has already exceeded the threshold value T0 (the binary code information is denoted as "Bin" in FIG. 4). As a result, the encoding circuit 130 is unable to quickly complete the encoding of superblock SB3 to generate the encoded data for use by the superblock SB5 in determining its quantization parameter. Therefore, the encoding circuit 130 directly uses a look-up table to estimate the bit number for the encoded data of superblock SB3, which will be used by superblock SB5 to determine its quantization parameter. The look-up table records multiple ranges of binary data amounts and their corresponding estimated bit numbers for the encoded data. In this embodiment, since the binary code information of the superblock SB3 exceeds the threshold value T0, the encoder 100 increases the quantization parameter of the superblock SB5 to reduce the amount of encoded data of the superblock SB5 generated during subsequent encoding. This helps maintain a stable output bitrate for the image frame.

In Step 402, the encoding circuit 130 has completed encoding superblock SB3 and generated the encoded data, so the encoding circuit 130 updates the previous estimated bit number by using the actual bit number of the encoded data. In addition, the superblocks SB4 and SB5 have determined their quantization parameters and binary codes, while the superblock SB6 is in the process of determining its quantization parameter. In this embodiment, when processing the superblock SB4, the binary code information exceeds a threshold value T1, where T1 is greater than threshold T0. As a result, the encoding circuit 130 enters a bit number limitation mode. In this mode, since the current binary code information is too high and may affect subsequent operations, the encoding circuit 130 directly uses the aforementioned look-up table to estimate the bit number for the encoded data of superblock SB4. This estimated value will be used by the superblock SB6 to determine its quantization parameter. Additionally, when operating in the bit number limitation mode, the encoding circuit 130 temporarily does not update the estimated bit number of the encoded data of the superblock SB4. In this embodiment, since the binary code information for superblock SB4 exceeds threshold T1, the encoder 100 increases the quantization parameter for superblock SB6 to reduce the amount of encoded data of the superblock SB6 generated during subsequent encoding, thereby stabilizing the output bitrate of the image frame.

In Step 403, the superblocks SB5 and SB6 have determined their quantization parameters and binary codes, while the superblock SB7 is in the process of determining its quantization parameter. In this embodiment, when processing the superblock SB5, the binary code information is still greater than the threshold value T1, so the encoding circuit 130 continues to operate in the bit number limitation mode. In this mode, since the current binary code information is too high and may affect subsequent operations, the encoding circuit 130 directly uses the previously mentioned look-up table to estimate the bit number of the encoded data of superblock SB5. This estimated value is used by the superblock SB7 to determine its quantization parameter. Additionally, the encoding circuit 130 temporarily does not update the estimated bit number of the encoded data of the superblock SB5. In this embodiment, since the binary code information for the superblock SB5 exceeds threshold T1, the encoder 100 increases the quantization parameter of the superblock SB7 to reduce the amount of encoded data of the superblock SB7 generated during subsequent encoding, thereby stabilizing the output bitrate of the image frame.

In Step 404, the superblocks SB6 and SB7 have determined their quantization parameters and binary codes, while the superblock SB8 is in the process of determining its quantization parameter. In this embodiment, since the binary code information of the superblock SB6 still exceeds the threshold value T1, the encoding circuit 130 continues to operate in bit number limitation mode. In this mode, because the current binary code information is too high and may affect subsequent operations, the encoding circuit 130 directly uses the look-up table to estimate the bit number for the encoded data of superblock SB6. This estimated bit number is used by the superblock SB8 to determine its quantization parameter. Additionally, the encoding circuit 130 temporarily does not update the estimated bit number for the encoded data of the superblock SB6. In this embodiment, since the binary code information for superblock SB6 exceeds threshold T1, the encoder 100 increases the quantization parameter for the superblock SB8 to generate lower-bit-rate encoded data during subsequent encoding, thereby stabilizing the output bitrate of the image frame.

In Step 405, the superblocks SB7 and SB8 have determined their quantization parameters and binary codes, while the superblock SB9 is in the process of determining its quantization parameter. In this embodiment, since the binary code information of the superblock SB7 is less than a threshold value T2 (where T2 is smaller than TO), it indicates that the current binary code information has stabilized and will not affect the subsequent operations of the encoder 100. Therefore, the encoding circuit 130 exits the bit number limitation mode and returns to the normal mode. In one embodiment, the encoding circuit 130 can use the look-up table to generate the estimated bit number for the encoded data of the superblock SB7, which will be used by the superblock SB9 to determine its quantization parameter.

In Step 406, the encoding circuit 130 has completed the encoding of superblock SB7 and generated the encoded data. Therefore, the encoding circuit 130 uses the bit number of the encoded data to update the previously estimated bit number. Furthermore, the superblocks SB8 and SB9 have already determined their quantization parameters and binary codes, while the superblock SB10 is in the process of determining its quantization parameter. The operations for the superblock SB10 can be referenced based on the Steps 401-405 described above.

In one embodiment, the encoding circuit 130 can subsequently generate the encoded data of the superblocks SB4-SB6 and use the actual bit numbers of the encoded data of the superblocks SB4-SB6 to update their estimated bit numbers. In another embodiment, the encoding circuit 130 may not update the estimated bit numbers for the encoded data of the superblocks SB4-SB6, to reduce the hardware workload.

By using the control method of the above embodiments, the encoder 100 can effectively control the output bitrate even when superblock(s) with complex texture appear in the image frame, to address the problems mentioned in the prior art.

Figure 5:
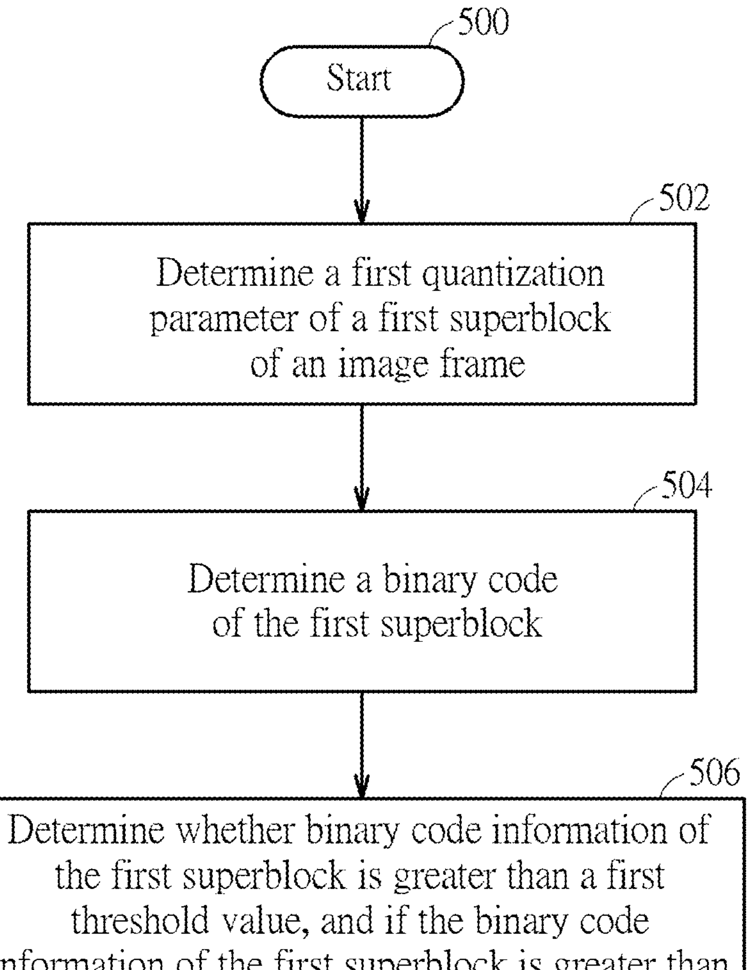
FIG. 5 is a flowchart of the encoding method of the encoder according to an embodiment of the present invention.

FIG. 5 is a flowchart of the encoding method of the encoder according to an embodiment of the present invention. Referring to the above embodiments, the flow is described as follows.

Step 500: the flow starts.

Step 502: determine a first quantization parameter of a first superblock of an image frame.

Step 504: determine a binary code of the first superblock.

Step 506: determine whether binary code information of the first superblock is greater than a first threshold value, and if the binary code information of the first superblock is greater than the first threshold value, increase a second quantization parameter of a second superblock.

In one embodiment, the binary code information of the first superblock is binary data amount or a binary rate of all superblocks that have already determined their binary codes in a row of superblocks to which the first superblock belongs.

In one embodiment, if the binary code information of the first superblock is greater than the first threshold, the encoder 100 generates an initial second quantization parameter for the second superblock according to at least the first quantization parameter, and then adds an offset to the initial second quantization parameter to generate the second quantization parameter. In one embodiment, the encoder 100 generates a bit number of encoded data of the first superblock according to the binary code of the first superblock, and generates the initial second quantization parameter of the second superblock according to at least the first quantization parameter and the bit number of the encoded data of the first superblock.

In one embodiment, the encoder 100 uses a look-up table to obtain an estimated bit number for the encoded data of the first superblock according to the binary code of the first superblock. In one embodiment, the encoder 100 uses the first quantization parameter to encode the binary code of the first superblock, generates an actual bit number of the encoded data of the first superblock, and then uses the actual bit number to update the estimated bit number.

In one embodiment, the encoder 100 determines whether the binary code information of the first superblock exceeds a second threshold value, where the second threshold value is greater than the first threshold value. If the binary code information does not exceed the second threshold value, the encoder 100 uses the first quantization parameter to encode the binary code of the first superblock, generates the actual bit number of the encoded data of the first superblock, and uses the actual bit number to update the estimated bit number. If the binary code information exceeds the second threshold, the encoder 100 enters a bit number limitation mode and does not update the estimated bit number.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An encoding method of an encoder, comprising:

determining a first quantization parameter of a first superblock of an image frame;

determining a binary code for the first superblock, wherein the binary code is subsequently encoded or compressed to generate encoded data of the first superblock;

determining whether binary code information of the first superblock is greater than a first threshold; and if the binary code information of the first superblock is greater than the first threshold, increasing a second quantization parameter of a second superblock;

wherein the binary code information of the first superblock is binary code data amount or a binary rate of all superblocks that have already determined their binary codes in a row of superblocks to which the first superblock belongs.

2. The encoding method of claim 1, wherein if the binary code information of the first superblock is greater than the first threshold, increasing the second quantization parameter of the second superblock comprises:

generating an initial second quantization parameter of the second superblock according to at least the first quantization parameter; and adding an offset to the initial second quantization parameter to generate the second quantization parameter.

3. The encoding method of claim 2, further comprising:

generating a bit number of the encoded data of the first superblock according to the binary code of the first superblock; and the step of generating the initial second quantization parameter of the second superblock according to at least the first quantization parameter comprises:

generating the initial second quantization parameter of the second superblock according to the first quantization parameter and the bit number of the encoded data of the first superblock.

4. The encoding method of claim 3, wherein the step of generating the bit number of encoded data of the first superblock according to the binary code of the first superblock comprises:

using a look-up table to obtain an estimated bit number for the encoded data of the first superblock according to the binary code of the first superblock.

5. The encoding method of claim 4, further comprising:

using the first quantization parameter to encode the binary code of the first superblock to generate an actual bit number of the encoded data of the first superblock; and using the actual bit number to update the estimated bit number.

6. The encoding method of claim 4, further comprising:

determining whether the binary code information of the first superblock is greater than a second threshold, where the second threshold is greater than the first threshold;

if the binary code information is not greater than the second threshold, using the first quantization parameter to encode the binary code of the first superblock to generate the actual bit number of the encoded data of the first superblock, and using the actual bit number to update the estimated bit number; and if the binary code information is greater than the second threshold, entering a bit number limitation mode, and not updating the estimated bit number.

7. The encoding method of claim 1, wherein the coding method supports an AV1 video coding format established by the Alliance for Open Media (AOMedia).

8. An encoder, configured to perform steps of:

determining a first quantization parameter of a first superblock of an image frame;

determining a binary code for the first superblock, wherein the binary code is subsequently encoded or compressed to generate encoded data of the first superblock;

determining whether binary code information of the first superblock is greater than a first threshold; and if the binary code information of the first superblock is greater than the first threshold, increasing a second quantization parameter of a second superblock;

wherein the binary code information of the first superblock is binary code data amount or a binary rate of all superblocks that have already determined their binary codes in a row of superblocks to which the first superblock belongs.

9. The encoder of claim 8, wherein if the binary code information of the first superblock is greater than the first threshold, increasing the second quantization parameter of the second superblock comprises:

generating an initial second quantization parameter of the second superblock according to at least the first quantization parameter; and adding an offset to the initial second quantization parameter to generate the second quantization parameter.

10. The encoder of claim 9, further comprising:

generating a bit number of the encoded data of the first superblock according to the binary code of the first superblock; and the step of generating the initial second quantization parameter of the second superblock according to at least the first quantization parameter comprises:

generating the initial second quantization parameter of the second superblock according to the first quantization parameter and the bit number of the encoded data of the first superblock.

11. The encoder of claim 10, wherein the step of generating the bit number of encoded data of the first superblock according to the binary code of the first superblock comprises:

using a look-up table to obtain an estimated bit number for the encoded data of the first superblock according to the binary code of the first superblock.

12. The encoder of claim 11, further comprising:

using the first quantization parameter to encode the binary code of the first superblock to generate an actual bit number of the encoded data of the first superblock; and using the actual bit number to update the estimated bit number.

13. The encoder of claim 11, further comprising:

determining whether the binary code information of the first superblock is greater than a second threshold, where the second threshold is greater than the first threshold;

if the binary code information is not greater than the second threshold, using the first quantization parameter to encode the binary code of the first superblock to generate the actual bit number of the encoded data of the first superblock, and using the actual bit number to update the estimated bit number; and if the binary code information is greater than the second threshold, entering a bit number limitation mode, and not updating the estimated bit number.

14. The encoder of claim 8, wherein the coding method supports an AV1 video coding format established by the Alliance for Open Media (AOMedia).

* * * * *